United States Patent
Bansal et al.

(10) Patent No.: US 11,010,480 B2
(45) Date of Patent: May 18, 2021

(54) PROTECTING VISIBLE CONTENT

(71) Applicant: INTERNATIONAL BUSINESS MACHINES CORPORATION, Armonk, NY (US)

(72) Inventors: Rinkesh I. Bansal, Pune (IN); Chintan Thaker, Pune (IN); Sanjay B. Panchal, Mumbai (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/170,301

(22) Filed: Oct. 25, 2018

(65) Prior Publication Data

US 2020/0134201 A1    Apr. 30, 2020

(51) Int. Cl.
| | |
|---|---|
| G06F 21/60 | (2013.01) |
| H04L 9/08 | (2006.01) |
| H04L 9/32 | (2006.01) |

(52) U.S. Cl.
CPC .......... G06F 21/602 (2013.01); H04L 9/0819 (2013.01); H04L 9/3297 (2013.01)

(58) Field of Classification Search
CPC ..... G06F 21/602; G06F 21/60; H04L 9/3297; H04L 9/0819; H04L 9/08; H04L 9/32
See application file for complete search history.

(56) References Cited

U.S. PATENT DOCUMENTS

| | | |
|---|---|---|
| 6,978,022 B2 | 12/2005 | Okimoto et al. |
| 9,008,310 B2 | 4/2015 | Nelson et al. |
| 2010/0169649 A1 | 7/2010 | Haas et al. |

(Continued)

FOREIGN PATENT DOCUMENTS

| | | | | |
|---|---|---|---|---|
| WO | WO-2016209292 A1 | * | 12/2016 | ......... G06F 21/6227 |
| WO | 2017135965 A1 | | 8/2017 | |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Ashokkumar B Patel
*Assistant Examiner* — Quazi Farooqui
(74) *Attorney, Agent, or Firm* — Ewa M. Wozniak

(57) ABSTRACT

The method, computer system, and computer program product for using a key management server to protect visible content. The method, computer program product, and computer system may include a key management server which may receive, from an encryption device, an identification of one or more portions of clear information visible on a physical document. The key management server may receive, from the encryption device, one or more permission parameters. The permission parameters may include a time duration parameter, a location parameter, a start and end time parameter, or a device identification parameter. Further, the key management server may receive, from a decryption device, a request to access a portion of the clear information. The key management server may transmit, to the decryption device, information permitting access to the portion of clear information.

20 Claims, 9 Drawing Sheets

(56) References Cited

U.S. PATENT DOCUMENTS

| | | | |
|---|---|---|---|
| 2013/0124868 A1* | 5/2013 | Sorotokin | G06Q 10/06 713/176 |
| 2013/0218829 A1 | 8/2013 | Martinez | |
| 2013/0219176 A1* | 8/2013 | Akella | G06F 16/185 713/165 |
| 2013/0262864 A1* | 10/2013 | Hamid | G06F 21/6227 713/165 |
| 2014/0164783 A1* | 6/2014 | Mayers | G06F 21/62 713/189 |
| 2014/0299660 A1 | 10/2014 | Melzer | |
| 2017/0098090 A1* | 4/2017 | Ali | G06F 40/10 |
| 2017/0270283 A1 | 9/2017 | Shiraishi et al. | |
| 2018/0048464 A1 | 2/2018 | Lim et al. | |
| 2020/0159907 A1* | 5/2020 | Johnson | G06T 5/001 |

OTHER PUBLICATIONS

Google, "Encryption in Transit in Google Cloud", Google Cloud Encryption Whitepaper, Nov. 2017, pp. 1-21.

Hou et al., "Novel Physically-Embedded Data Encryption for Embedded Device", 2013 12th IEEE International Conference on Trust, Security and Privacy in Computing and Communications, pp. 89-93.

\* cited by examiner

Database I                                                                 116

| User 130 | Document Portion Identifier 132 | Permission to Access 134 | Duration 136 | Start/ End Times (Optional) 138 | Key 140 |
|---|---|---|---|---|---|
| A | D1.1 | Yes | 30 seconds |  | K1 |
| A | D1.2 | Yes | 10 seconds |  | K2 |
| B | D1.1 | Yes | 30 seconds |  | K1 |
| B | D1.2 | No |  |  | K2 |
| C | D1.1 | No |  |  | K1 |
| C | D1.2 | Yes | 10 seconds |  | K2 |

FIGURE 2a

Database II                                                                 118

| User 130 | Document Portion Identifier 132 | Permission to Access 134 | Duration 136 | Start/ End Times (Optional) 138 | Special Character 142 |
|---|---|---|---|---|---|
| A | D1.1 | Yes | 30 seconds | | * |
| A | D1.2 | Yes | 10 seconds | | # |
| B | D1.1 | Yes | 30 seconds | | * |
| B | D1.2 | No | | | # |
| C | D1.1 | No | | | * |
| C | D1.2 | Yes | 10 seconds | | # |

FIGURE 2b

PROTECTING VISIBLE CONTENT

BACKGROUND

Embodiments of the present invention relate generally to a method, system and computer program for using a key management server to protect visible content.

Clear information, such as credit card numbers, social security numbers, or any other information may be important to a user or a business. In either case, it may be important for the clear information to be protected from unauthorized use.

BRIEF SUMMARY

An embodiment of the present invention may include a method, computer system, and computer program product for using a key management server to protect visible content. The method, computer program product, and computer system may include a key management server which may receive, from an encryption device, an identification of one or more portions of clear information visible on a physical document. The key management server may receive, from the encryption device, one or more permission parameters. The permission parameters may include a time duration parameter, a location parameter, a start and end time parameter, or a device identification parameter. Further, the key management server may receive, from a decryption device, a request to access a portion of the clear information. The key management server may transmit, to the decryption device, information permitting access to the portion of clear information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 2a is a schematic block diagram illustrating a database for storing key information in accordance with an embodiment of the invention.

FIG. 2b is a schematic block diagram illustrating a database for storing masking information in accordance with an embodiment of the invention.

DETAILED DESCRIPTION

Figure 1:
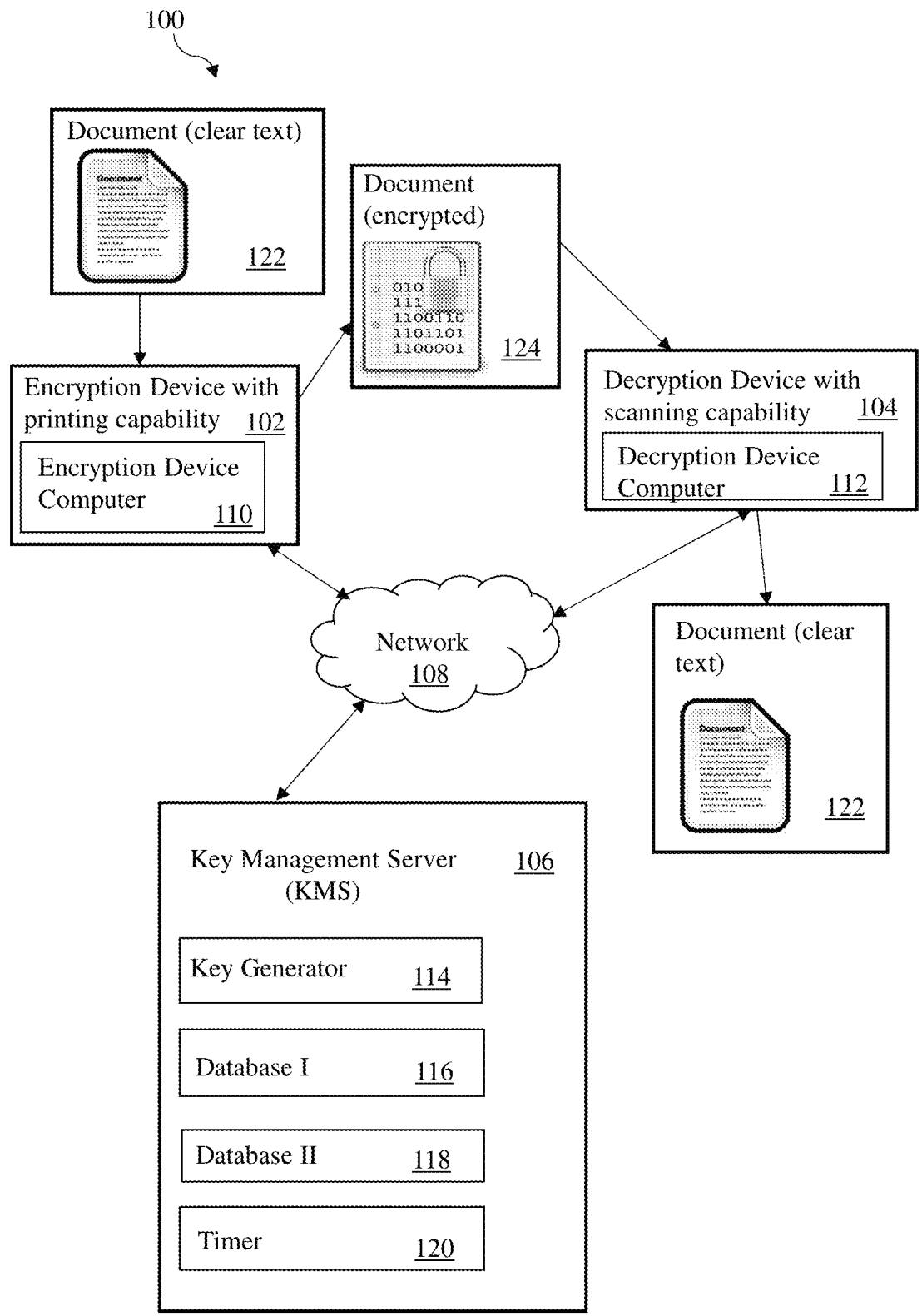
FIG. 1 is a schematic block diagram illustrating a system for using a key management server to protect visible content, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for using a key management server to protect visible content. In an embodiment of the present invention, a user may use an encryption device to encrypt clear information and store the key with a key management server. Alternatively, the user may use an encryption device to mask the clear information with a special character and store the clear information at the key management server.

The user may set permission parameters to limit the access to the clear information to one or more individuals specified by the user or to limit access to a specific time period. This may be helpful when the clear information is such that it should only be viewed by one individual for a short period of time.

A problem with printing clear information on paper is the fact that all users have access to it. Anyone may be able to see the clear information and utilize it to the detriment of the user whose clear information it is. For example, the user may print a document with the user's credit card information displayed. This information not only includes the user's name and address but also the user's credit card number, it's expiration date and the additional security code. If in the wrong hands, such clear information may cause the user great financial loss. Likewise, businesses may want to protect clear information concerning the business because such information, if in the wrong hands, may have a detrimental effect on the business.

Accordingly, at least some of the embodiments described herein provide a technical solution to the problems described above with respect to protecting clear information. Specifically, some embodiments described herein provide a method of protecting visible content using a key management server.

Reference will now be made in detail to the embodiments of the present invention, examples of which are illustrated in the accompanying drawings, wherein like reference numerals refer to like elements throughout. Embodiments of the invention are generally directed to using a key management server to protect visible content.

FIG. 1 illustrates a system 100 for protecting visible content using a key management server, in accordance with an embodiment of the present invention. In an example embodiment, system 100 may include an encryption device 102, a decryption device 104, and a key management server 106, all connected via one or more networks 108.

In the example embodiment, the network 108 is the Internet, representing a world wide collection of networks and gateways to support communications between devices connected to the Internet. The network 108 may include, for example, wired, wireless, or fiber optic connections. In alternative embodiments, the network 108 may be implemented as an intranet, a local area network (LAN), or a wide area network (WAN). In general, the network 108 can be any combination of connections and protocols that will support communications between the encryption device 102, decryption device 104, and the key management server 106.

The encryption device 102 may include an encryption device computer 110. The decryption device 104 may include a decryption device computer 112. In an embodiment of the present invention, the encryption device 102 and the decryption device 104 may be a printer, a scanner, a mobile terminal, such as a smartphone, or a wearable computer glasses or other devices with augmented reality overlay capability that add information alongside of or in place of what the wearer sees in the physical environment, for example Google Glasses, but is not limited to such. Other examples may include a laptop computer, tablet, desktop computer, or a peripheral device such as a smartwatch or other wearable device, or any programmable electronic device supporting the functionality required by one or more embodiments of the invention. The encryption device computer 110, the decryption device computer 112, and the key management server 106 may be instances of the computer 1010 shown in FIG. 6.

The key management server 106 comprises, in various embodiments, one or more of the following: a key generator 114, a database I 116, a database II 118, and a timer 120. The key management server 106 may be any type of a cryptographic system that is capable of generating, managing, distributing and destroying keys, storing clear information, and providing time management functions. In an embodiment of the present invention, clear information may be any type of information. Some examples of clear information may include, bank account numbers, social security numbers, credit card numbers, or any information that is important to a user or to a business.

In an embodiment, the key generator 114 may create a key that the encryption device 102 may use to encrypt clear information that is visible on a document 122. In the example of FIG. 1, the document 122 contains clear text. When the document 122 is subsequently printed, it may contain one or more encrypted portions, shown in the Figure as document 124. The protected document 124 may have clear information encrypted with an encryption value. The encryption value may include numbers, letters, or a combination of both. As a result of encryption, clear information is not shown on the printed document 124 and is protected from the possibility of unauthorized use. For example, a user wanting to protect the user's social security number may want the number to be encrypted with an encryption value. The key generator 114 may generate a key that may be used to partially, or wholly, encrypt the clear information. As a result, the protected document 124, when printed, may display the encryption value, not the social security number.

In an alternative embodiment, the key generator 114 may assign special characters that may be used to mask clear information. As a result, the printed document 124 may have a special character visible in place of the clear information, thus protecting the information from unauthorized use. For example, the key generator 114 may assign an asterisk as the special character that may be used to mask the first twelve digits of a sixteen-digit credit card number. Alternatively, the special character may be used to mask the whole sixteen-digit credit card number, or any combination of digits that the user specifies.

The database I 116 and database II 118 are databases that may store information pertaining to who may have permission to view the clear information, for how long, or how many times the information may be accessed. The database I 116 and database II 118 may also store the keys or the special characters generated or assigned by the key generator 114.

The timer 120 may be used to keep track of the amount of time clear information is visible to a user that is authorized to view the information. The timer 120 may also store information pertaining to the number of times an authorized user may access the clear information. The timer 120 may be configured to the needs and specifications of each user or to the specific requirements for each portion of clear information, or both. For example, the timer 120 may be configured to allow the authorized user to view a particular portion of clear information only once, for 30 seconds. The timer 120 may also be configured to allow another authorized user to view that same piece of clear information more than once; however, that user may be able to view the information for 20 seconds only, per each view. Alternatively, the timer 120 may be configured to allow the authorized user to view a particular portion of the clear information only once for 25 seconds, and another portion of the clear information twice, for 60 seconds each.

FIGS. 2a and 2b illustrate, in schematic view, different categories of information that may be stored in database I 116 and database II 118, respectively. As shown in FIG. 1, database I 116 and database II 118 may be located in the key management server 106. Referring to FIG. 2a, database I 116 may be used to store information pertaining to a user 130, a document portion identifier 132, permission to access 134, duration 136, an optional start and end time 138, and a key 140. This information may be used to determine which user 130 may have access to the key 140 that may be used to decrypt a specific document portion 132. For example, referring to the first row of FIG. 2a, user A may have permission to access clear information contained in portion 1 of document 1. User A may have permission to access the clear information encrypted with the key 140 abbreviated "K1." User A may view this clear information for 30 seconds only.

Alternatively, as shown in the fifth row of FIG. 2a, user C may not have permission to access the document portion 132 identified as D1.1 (document 1, portion 1). Therefore, when user C requests for the key 140 K1 to be provided, the key management server 106 will deny the request because user C is not authorized to access the clear information contained in document portion D1.1. Alternatively, as shown in the third row of FIG. 2*a*, user B's request for key 140 K1 may be granted because user B is authorized to access the clear information contained in document portion D1.1. User B may be able to view the clear information contained in document portion D1.1 for 30 seconds. It should be appreciated that embodiments in which viewing time is limited to specific time period, such as 30 seconds are practical only with a decryption device 104 with a capability to display information in a transitory manner, e.g. an electronic display, and not with a device that displays information in a non-transitory manner, e.g. a printer.

In an embodiment of the present invention, the optional start and end time 138 may be utilized to provide access to view the clear information at a particular time. The particular time may refer to a time of day, a day of the week, a certain month, or any other time that the user may choose to allow access to view the clear information. For example, referring to the first row of FIG. 2*a*, user A may have permission to view the clear information contained in portion 1 of document 1 for 30 seconds only. The optional start time 138 may indicate that user A may be allowed to access the clear information on Monday (not shown in FIG. 2*a*). Alternatively, user A may be allowed to access the clear information on Oct. 4, 2018 at 10 am.

In an alternative embodiment of the present invention, the optional start and end time 138 may be customized for each user. For example, the optional start and end time 138 may be utilized to give user A access to view the clear information at 10 am on a Monday. On the other hand, user B may be given access to view the same clear information as user A on Monday at 12 pm. The optional start and end time 138 may be customized to the needs and specifications of the users.

Referring to FIG. 2*b*, database II 118 may be used to store information respecting the user 130, the document portion 132, permission to access 134, duration 136, the optional start and end time 138, and a special character 142. The special character 142 may refer to the character that may be used to mask the clear information. The special character 142 may be any character such as an asterisk, a hashtag, or exclamation point. Alternatively, the special character 142 may be any other type of special character that may be used to distinguish and mask the clear information to protect it from unauthorized use.

For example, as shown in the first row of FIG. 2*b*, user A may view the clear information contained in portion 1 of document 1. User A may view the information for only 30 seconds. The clear information that User A may see is the information that is masked with the special character "*." Further, as shown in the second row of FIG. 2*b*, user A may also view the clear information contained in portion 2 of document 1. However, user A may only view the clear information, masked with the special character "#," for 10 seconds only. As database II 118 may indicate, user A may view the clear information contained in portions 1 and 2 of document 1. Each portion may contain clear information masked with a different special character 142 and may have different viewing durations 136.

In another example, as shown in the third and fourth rows of FIG. 2*b*, user B may have permission to view portion 1 of document 1. However, user B may not have permission to view portion 2 of document 1. Each document section may be identified with its own document portion identifier 132. A document portion identifier 132 may be associated with position and shape parameters, e.g., a 2×10 cm rectangular region having an upper right corner 20 cm from a top edge and 35 cm from a left edge of a 594×841 cm page. Alternatively, a document portion identifier 132 may be associated with a predefined field in a document, such as an account or social security number field on a form document. In addition, the clear information in each document portion may be masked with its own special character 142. Therefore, portion 1 of document 1 may be identified with the document portion identifier 132 D1.1 and portion 2 of document 1 may be identified with the document portion identifier 132 D1.2. Further, the clear information contained in D1.1 may be assigned "*" as the special character 142 whereas the clear information contained in D1.2 may be assigned a different special character 142, such as "#."

Both FIGS. 2*a* and 2*b* show the different combinations of access rights that a user may have to the clear information, protected either by encryption with the key 140 or by masking with a special character 142. In an embodiment of the present invention, database I 116 may store information respecting the key 140, whereas database II 118 may store the clear information (not shown in FIG. 2*b*) and information respecting the special character 142. The different combinations of access rights that a user may have to the clear information may be associated with the optional start and end time 138 of viewing of the clear information, as described above with reference to FIG. 2*a*.

The different combinations of access rights that a user may have to the clear information may be associated with a location permission parameter stored in database I 116 or database II 118 (not shown in the FIGS. 2*a* and 2*b*). For example, access to the clear information may be permitted when the user is in a secure location, such as work or home, but may not be permitted when the user is in an unsecure location, such as a restaurant or public transportation. Therefore, referring to the first row of FIGS. 2*a* and 2*b*, user A may have permission to access clear information contained in document portion D1.1 for 30 seconds. The location parameter (not shown in FIGS. 2*a* and 2*b*) may indicate that user A may be allowed to access the clear information only when user A is at work. When user A, located in a restaurant, requests to access document portion D1.1, the key management server 106 will deny the request because user A is not authorized to access the clear information contained in document portion D1.1 when user A is anywhere but at work. Alternatively, the key management server 106 may allow access to document portion D1.1 when user A requests to access the clear information contained in document portion D1.1 while at work. In an embodiment, a decryption device 104 may be equipped with a GPS device for determining its location and the location permission parameter may be determined by the decryption device 104 using GPS data.

The different combinations of access rights that a user may have to the clear information may also be associated with an identification of the decryption device 104 that may be used to access the clear information. A permission parameter based on device identification may be stored in database I 116 or database II 118 (not shown in the FIGS. 2*a* and 2*b*). A permission parameter based on device identification may include any suitable type of device identifying feature. The decryption device 104 may be identified by an Internet Protocol (IP) address parameter (not shown in the Figures). For example, access to the clear information may be permitted when the user of the decryption device 104 is associated within a specific IP address or IP address range, but may not be permitted when the user of the decryption device 104 is outside the specific IP address or IP address range. In addition, decryption device 104 may be identified by its operating system, such as Windows, Mac, Linux, or any other type of operating system supporting the functionality required by one or more embodiments of the invention. In an embodiment, a decryption device 104 may determine information for permission parameter based on device identification using its system registry or other system files. As another example of a permission parameter based on device identification, a permission parameter may be that the device is capable of displaying information in a transitory manner and is not capable of printing hard copy.

Figure 3:
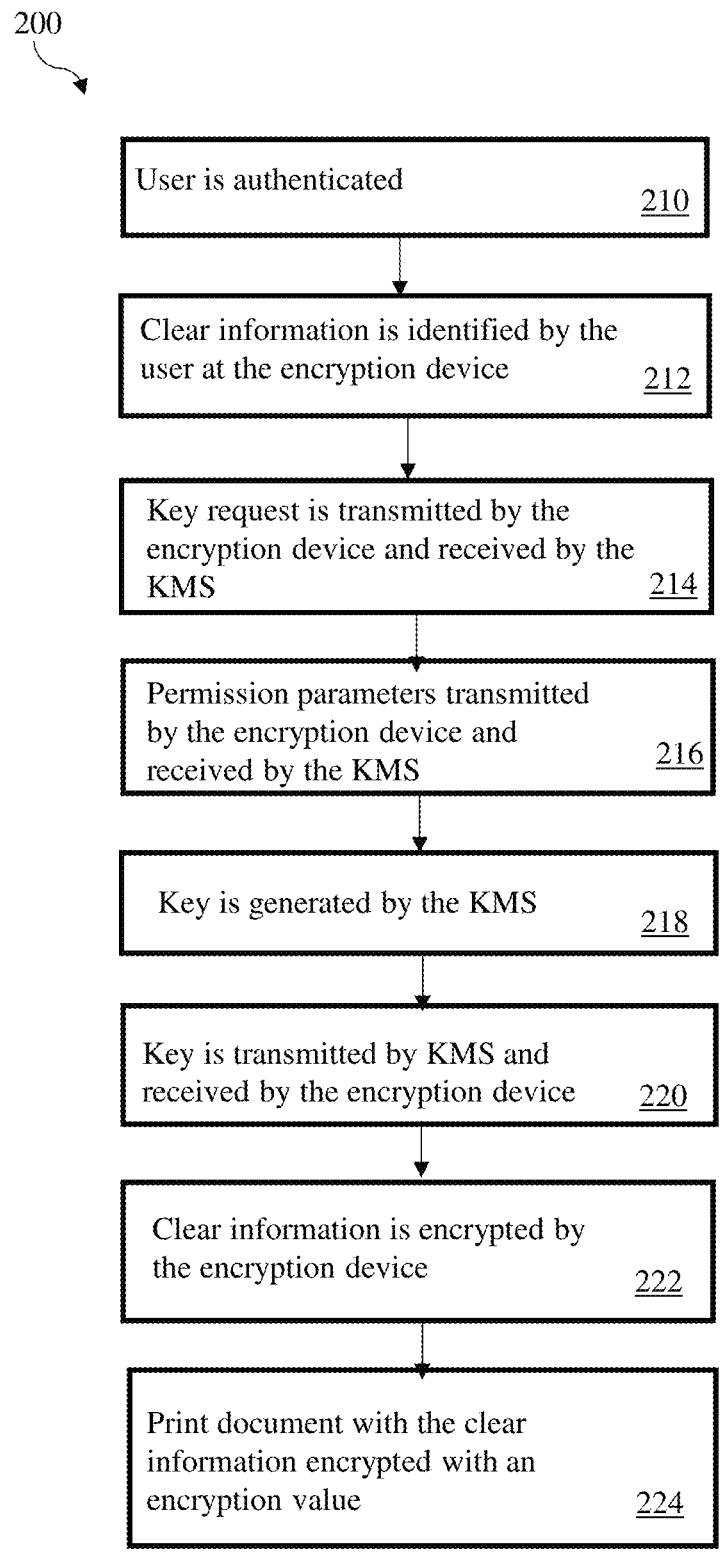
FIG. 3 is a flow chart illustrating an example method for using a key management server to protect visible content using a key, in accordance with another embodiment of the invention.

Referring to FIG. 3, a method 200 for using a key management server 106 to protect printed content using a key is depicted, in accordance with an embodiment of the present invention. Referring to operation 210, a user using the encryption device 102 is authenticated. The user may login to an account that may allow the use of the encryption device 102. During the login, the user may provide the user login name and the associated password.

Referring to operation 212, the user identifies, at the encryption device 102, the document and the clear information that the user may want to protect from unauthorized use, e.g. portion D1.1. The clear information may be the user's personal information such as a social security number or a credit card number. The clear information may also be any type of information that is of some importance to the user or to a business entity. A user may input position and shape parameters for each portion of a document containing clear information in any known manner, including entry via a key pad or a touch screen displaying an image of the document. A user may identify the clear information by inputting that the document is one in which the position and shape parameters are predefined, e.g., the document is a tax form or financial statement with predefined fields.

Referring to operation 214, the encryption device 102 transmits a key request to the key management server 106. The encryption device 102 also transmits permission parameters to the key management server 106, at operation 216. The key management server 106 stores the permission parameters in database I 116. The permission parameters may include information relating to who may be authorized to get the key from the key management server 106. Permission parameters may also include information pertaining to the amount of time the user is authorized to view the clear information, how many times the user may access the clear information, as well as other permission parameters described herein.

In an embodiment of the present invention, permission parameters may be different for each user, as illustrated in FIGS. 2a and 2b. For example, user A may have longer viewing privileges of the clear information than user B. Further, user A may view the clear information contained in portions of the document that user B or user C may not have permission to access. The permission parameters may be configured to the needs and specifications of the user, taking into account the type of clear information the user is dealing with.

Referring to operation 218, the key management server 106 generates the key 140 and transmits it, at operation 220, to the encryption device 102. Once the key 140 is received by the encryption device 102, the encryption device 102 encrypts the clear information using the key 140 with an encryption value that corresponds to the key 140. The user, at operation 224, may print the document with the clear information encrypted with an encryption value. The corresponding key 140 is stored with the key management server 106 database I 116. During the decryption process (explained with reference to FIG. 5), an authenticated user may request the key 140 to be transmitted, by the key management server 106, to the decryption device 104.

Figure 4:
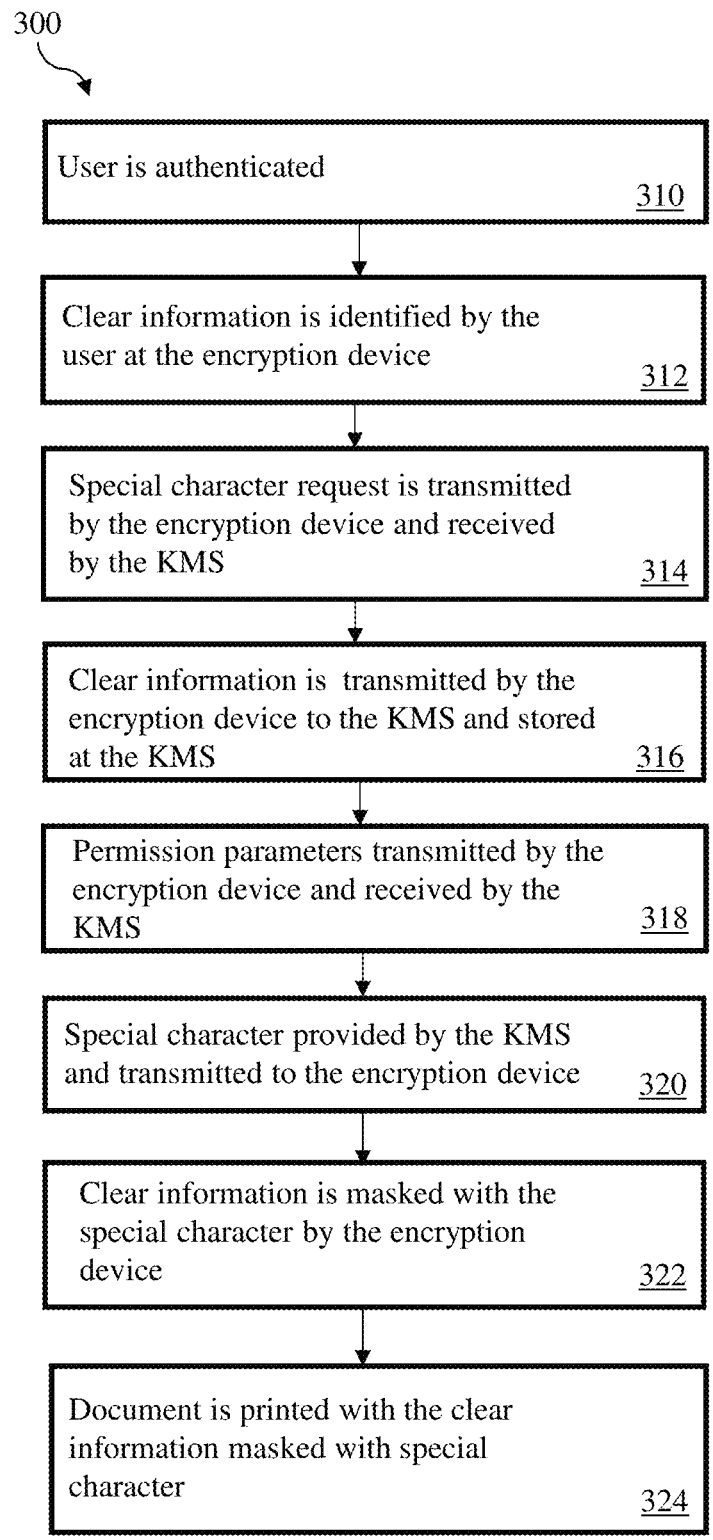
FIG. 4 is a flow chart illustrating an example method for using a key management server to protect visible content using a mask, in accordance with an embodiment of the invention.

Referring to FIG. 4, a method 300 for using a key management server 106 to protect printed content using a mask is depicted, in accordance with an alternative embodiment of the present invention. FIG. 4 is substantially similar to FIG. 3. However, instead of encrypting the clear information, as shown at operation 222, the clear information is masked with a special character.

Operations 310-312 are the same as operations 210-212 described above, respectively.

Referring to operation 314, the encryption device 102 transmits a special character request to the key management server 106. The encryption device 102 also transmits, at operation 316, the clear information in each portion of the document identified in operation 312 to the key management server 106 to be stored at the key management server 106.

Referring to operation 318, the encryption device 102 transmits permission parameters to the key management server 106. The permission parameters are stored in database II 118. As stated above, the permission parameters may include information about which user may access the particular portions of a document. In addition, the permission parameters may also indicate the number of times each user may access the clear information and the duration of each access.

Referring to operation 320, the key management server 106 provides the special character and transmits it to the encryption device 102. The encryption device 102 uses the special character and masks, at operation 322, the clear information such that the clear information is not visible. Rather, the user may see the special character in the place where the clear information once was. The user, at operation 324, may print the document with the clear information masked with the special character.

Figure 5:
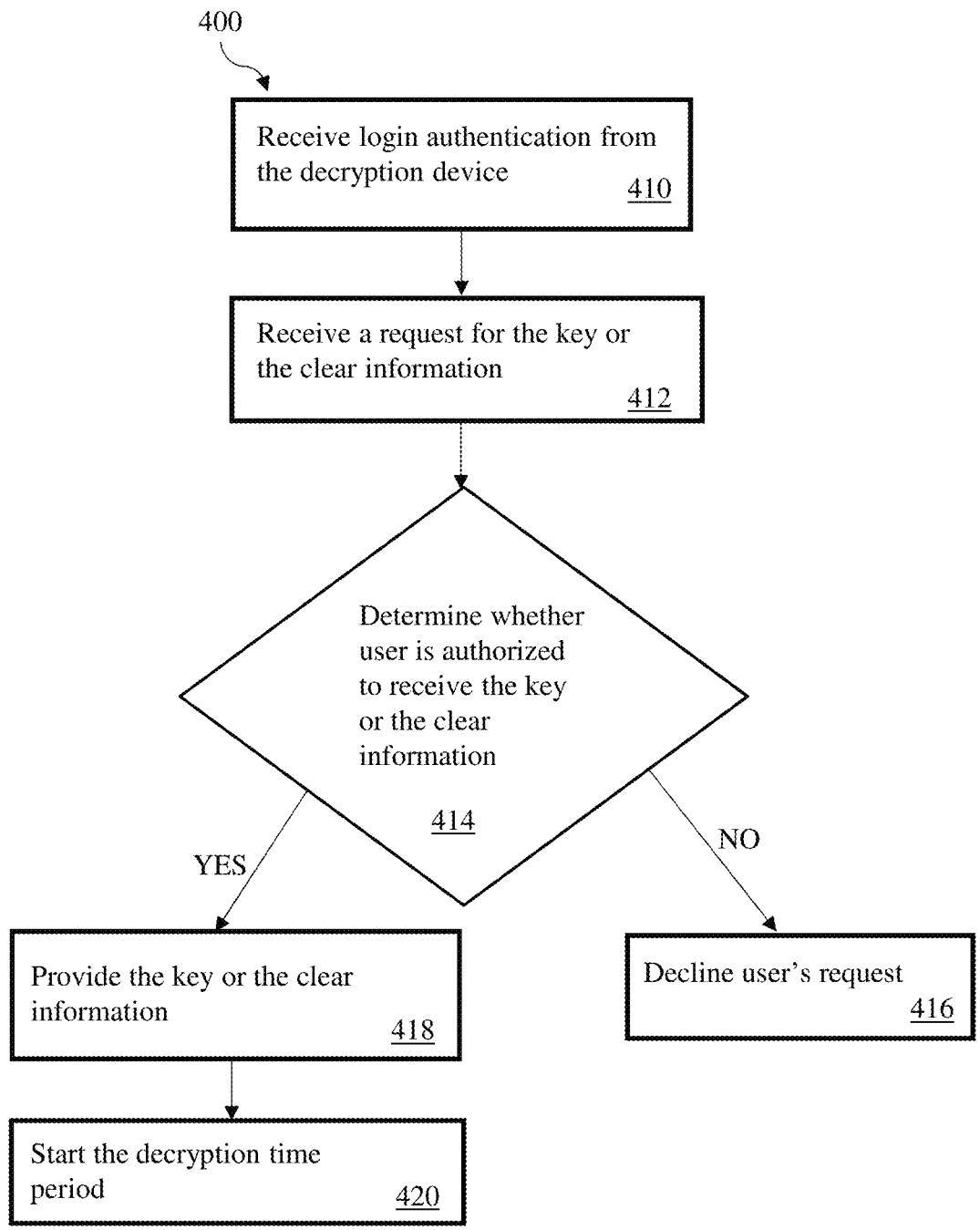
FIG. 5 is a flow chart illustrating an example method for using a key management server to view protected content, in accordance with an embodiment of the invention.

Referring to FIG. 5, a method for using a key management server 106 to view protected content is depicted, in accordance with an embodiment of the present invention.

Referring to operation 410, the key management server 106 receives user login authentication from the decryption device 104. The decryption device 104 may verify that the user is an authorized user by having the user login to the decryption device 104 with the user's login and password credentials.

Referring to operation 412, the key management server 106 receives, from the decryption device 104, either a request for the key 140 (if the clear information in a document is encrypted) or a request for the clear information that was stored with the key management server 106 (if the clear information in a document is masked) at operation 316 (FIG. 4). A request for a key or a request for the clear information in operation 412 may be collectively referred to as a request to access the clear information. The request to access the clear information may include an identification of the portion of the document containing the clear information in encrypted or masked form. As part of operation 412, the decryption device 104 may transmit, to the key management server 106, the special character 142 that is associated with the clear information the user may want to view, which may serve as an identifier of the portion of the document containing the clear information to be unmasked.

Referring to operation 414, the key management server 106 determines whether the user requesting the key 140 or the clear information is authorized to receive the key 140 or the clear information stored at the sever. For example, the key management server 106 may access the information stored in either database I 116 or database II 118 to determine whether the user is authorized to view the clear information that was encrypted with the key 140 or masked with the special character 142. In addition, the key management server 106 may request and receive from a decryption device 104 location or device identification information for evaluating a permission parameter based on location or device identification. For example, the key management server 106 may request and receive from a decryption device 104 location a current location of the device 104.

If the key management server 106 determines that the user is not authorized to receive the key 140 or the clear information, the key management server 106 may decline the user's request (operation 416). For example, referring to the fourth line of FIG. 2*a*, user B may want to view the clear information D1.2 encrypted with the key 140 abbreviated "K2". User B may send a request to the key management server 106 to get the key K2. The key management server 106 may receive user B's login authentication through the decryption device 104. The key management server 106, through the user of its database I 116, knows that user B is permitted to view the clear information contained in D1.1 but not permitted to view the clear information in D1.2. Therefore, when user B requests the key K2, the key management server 106 will decline user B's request because user B is not authorized to receive that key 140.

However, if the key management server 106 determines that the user is authorized to receive the key 140 or the clear information, the key management server 106 may provide, at operation 418, the key 140 or the clear information. Once the key 140 or the clear information is provided to the user, the key management server 106, at operation 420, starts the time period corresponding to the duration 136 of the decryption process.

The time period corresponding to the duration 136 may refer to the time during which the user may view the clear information. The user may use any decryption device 104, such as a scanner, a mobile terminal, a wearable computer glasses or any programmable electronic device supporting the functionality required by one or more embodiments, to view the clear information. The user may also use wearable computer glasses or other devices with augmented reality overlay capability that add information alongside of or in place of what the wearer sees in the physical environment, for example Google Glasses, as the decryption device 104 to access and view the clear information. Therefore, when the key management server 106 provides the key 140 (operation 418), the decryption device 104 will use the key 140 to decrypt the clear information and display the clear information on its display. Alternatively, when the key management server 106 provides the clear information to the decryption device 104 (operation 418), the decryption device 104 may display the clear information on its display. In both scenarios, the decryption device 104 may display the clear information only for the duration 136 that may be associated with the particular clear information that is on display.

For example, as illustrated in line one of FIGS. 2*a* and 2*b*, user A's duration 136 period of 30 seconds may start at the time the key management server 106 provides the key 140 K1 to the user. Further, as illustrated in line two of FIGS. 2*a* and 2*b*, user B's duration 136 period to view the clear information is also 30 seconds. It is during this duration 136 period that both user A and user B may be able to access and view the clear information.

Therefore, once the key 140 or the clear information corresponding to the special character 142 is provided to the user 130, the duration 136 period is triggered. Once the duration 136 period expires, the user 130 may no longer have access to view the clear information because the clear information may either be masked with the special character or encrypted with the encryption value.

In embodiments of the present invention, described above, the key 140 that the key management server 106 may send to the encryption device 102 to encrypt the clear information may be a symmetric key 140. Alternative embodiments of the present invention may also utilize the key 140 that is asymmetric to encrypt the clear information.

Figure 6:
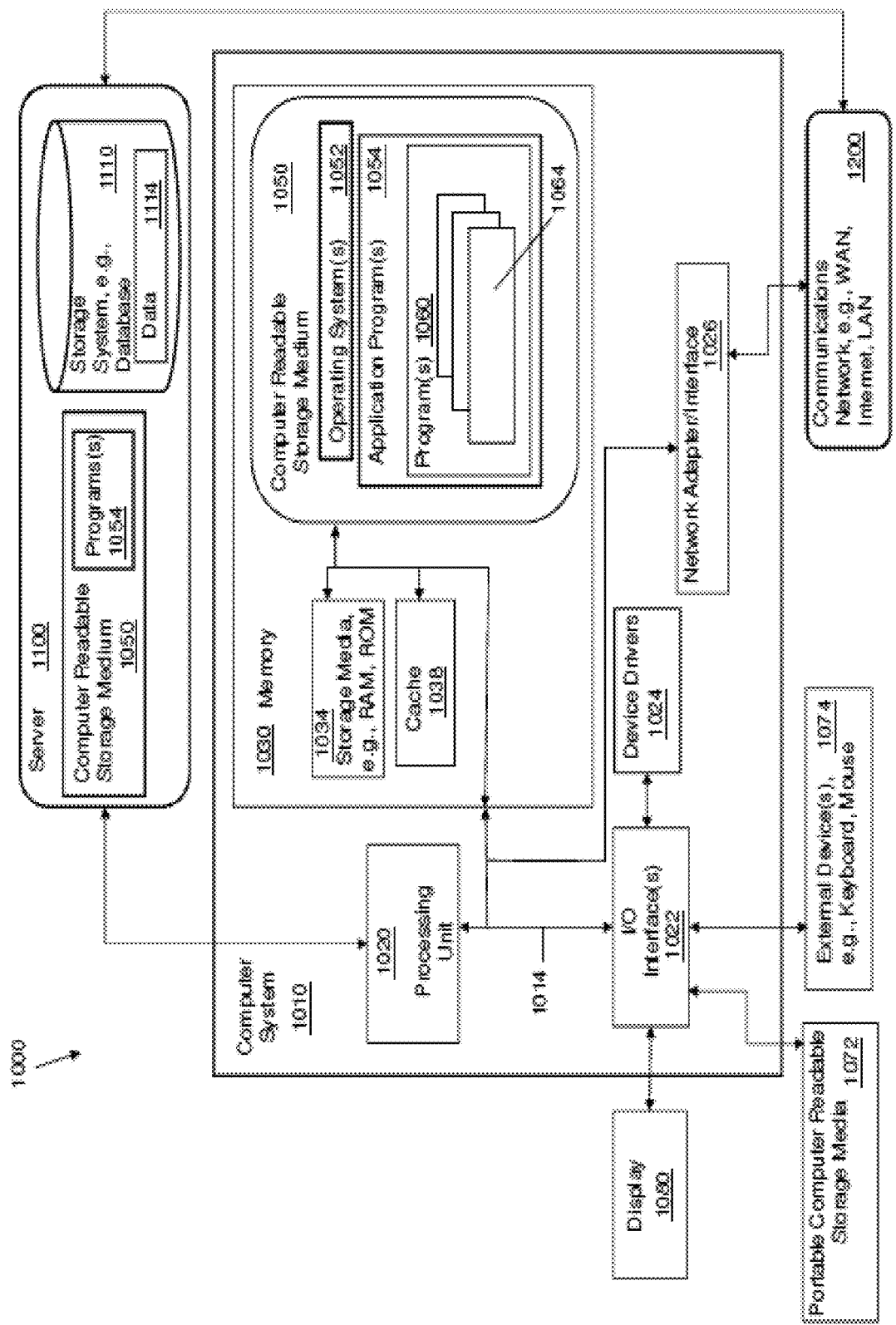
FIG. 6 is a block diagram depicting the hardware components of a system for protecting visible content, in accordance with an embodiment of the invention.

Referring to FIG. 6, a system 1000 includes a computer system or computer 1010 shown in the form of a generic computing device. The methods 200, 300, and 400, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 6 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200, 300, and 400 (FIGS. 3, 4 and 5), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
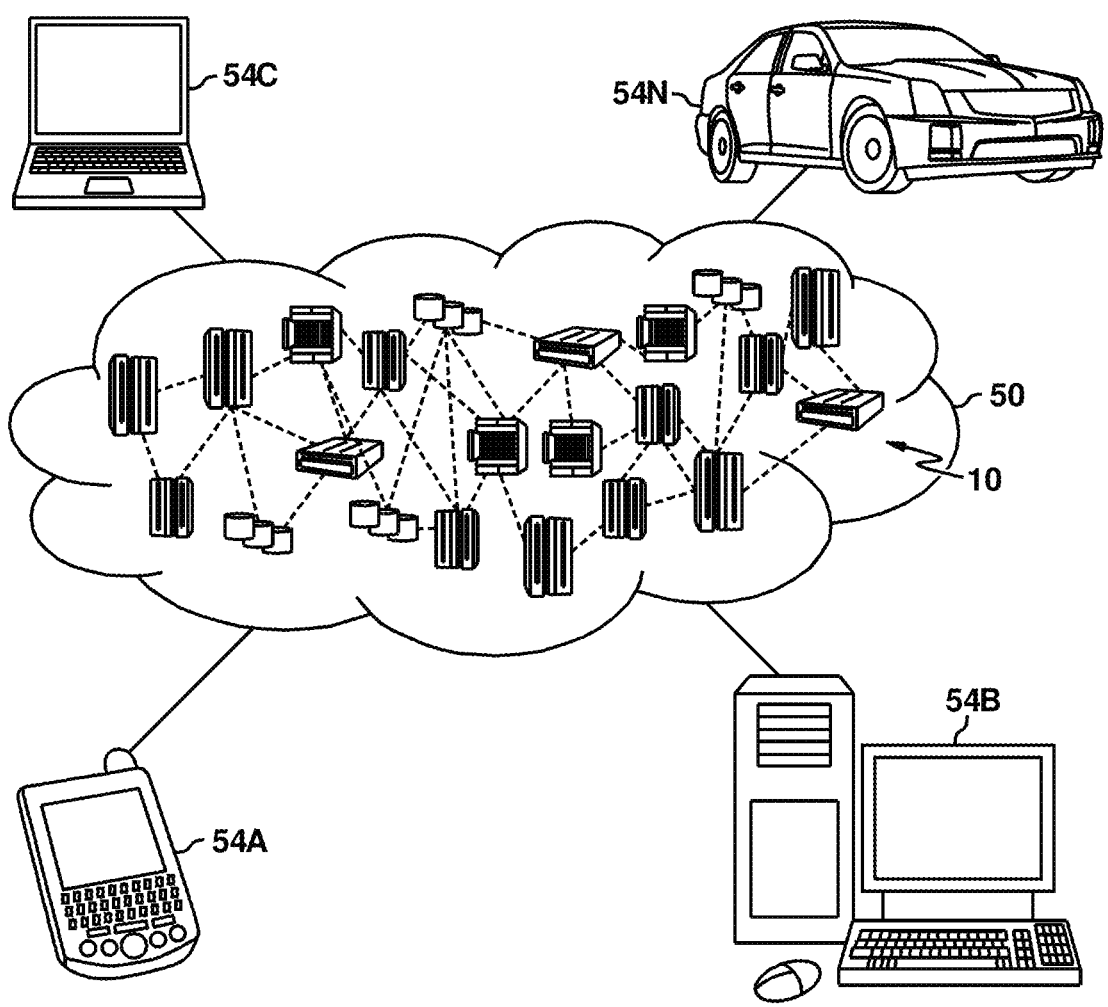
FIG. 7 is a functional block diagram depicting a cloud computing environment, in accordance with an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
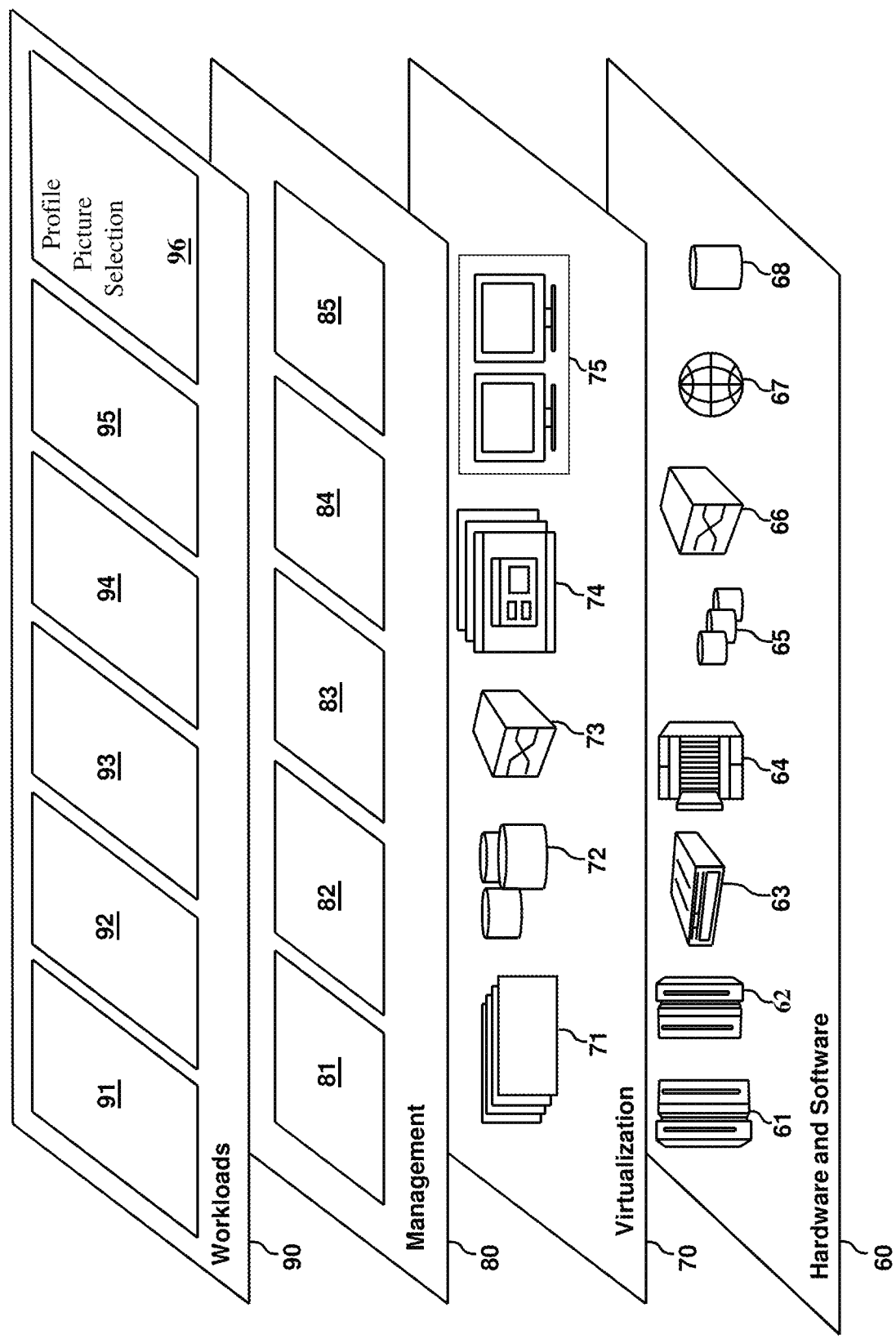
FIG. 8 is a diagram depicting abstraction model layers provided by the cloud computing environment of FIG. 7, in accordance with an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and protecting visible content 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting clear information visible on a physical document, comprising:
    receiving from an encryption device, by a key management server, an identification of one or more portions of clear information visible on a physical document, wherein the receiving from the encryption device, by the key management server, the identification of one or more portions of clear information further comprises receiving the one or more portions of clear information, the method further comprising storing the one or more portions of clear information at the key management server;
    receiving from the encryption device, by the key management server, one or more permission parameters, wherein the one or more permission parameters includes a time duration parameter;
    receiving from a decryption device, by the key management server, a request to access a portion of the clear information; and
    transmitting to the decryption device, by the key management server, information permitting access to the portion of clear information.

2. The method of claim 1, wherein the one or more permission parameters further comprises a user identification parameter.

3. The method of claim 1, wherein the one or more permission parameters further comprises a location parameter.

4. The method of claim 1, wherein the one or more permission parameters further comprises a start and end time parameter.

5. The method of claim 1, wherein the one or more permission parameters further comprises a device identification parameter.

6. The method of claim 1, wherein the transmitting to the decryption device by the key management server the information permitting access to the portion of clear information further comprises transmitting one or more keys.

7. The method of claim 6, wherein the one or more keys is a symmetric key.

8. The method of claim 1, further comprising transmitting one or more special characters to the encryption device by the key management server for use in masking the one or more portions of clear information.

9. A computer program product for protecting clear information visible on a physical document, the computer program product comprising:
    a computer-readable storage medium having program instructions embodied therewith, the program instructions executable by a computer to cause the computer to perform a method, comprising:
        receiving from an encryption device, by a key management server, an identification of one or more portions of clear information visible on a physical document, wherein the receiving from the encryption device, by the key management server, the identification of one or more portions of clear information further comprises receiving the one or more portions of clear information, the method further comprising storing the one or more portions of clear information at the key management server;
        receiving from the encryption device, by the key management server, one or more permission parameters, wherein the one or more permission parameters includes a time duration parameter;
        receiving from a decryption device, by the key management server, a request to access a portion of the clear information; and
        transmitting to the decryption device, by the key management server, information permitting access to the portion of clear information.

10. The computer program product of claim 9, wherein the one or more permission parameters further comprises a user identification parameter.

11. The computer program product of claim 9, wherein the one or more permission parameters further comprises a location parameter.

12. The computer program product of claim 9, wherein the transmitting to the decryption device by the key management server the information permitting access to the portion of clear information further comprises transmitting one or more keys.

13. The computer program product of claim 9, further comprising transmitting one or more special characters to the encryption device by the key management server for use in masking the one or more portions of clear information.

14. A system for protecting clear information visible on a physical document, the system comprising:
    a computer system comprising, a processor, a computer readable storage medium, and program instructions stored on the computer readable storage medium being executable by the processor to cause the computer system to:
        receive from an encryption device, by a key management server, an identification of one or more portions of clear information visible on a physical document, wherein the receiving from the encryption device, by the key management server, the identification of one or more portions of clear information further comprises receiving the one or more portions of clear information, the method further comprising storing the one or more portions of clear information at the key management server;

receive from the encryption device, by the key management server, one or more permission parameters, wherein the one or more permission parameters includes a time duration parameter;

receive from a decryption device, by the key management server, a request to access a portion of the clear information; and transmit to the decryption device, by the key management server, information permitting access to the portion of clear information.

15. The system of claim 14, wherein the one or more permission parameters further comprises a start and end time parameter.

16. The system of claim 14, wherein the transmitting to the decryption device by the key management server the information permitting access to the portion of clear information further comprises transmitting one or more keys.

17. The system of claim 14, further comprising transmitting one or more special characters to the encryption device by the key management server for use in masking the one or more portions of clear information.

18. The system of claim 14, wherein the one or more permission parameters further comprises a location parameter.

19. The system of claim 14, wherein the one or more permission parameters further comprises a user identification parameter.

20. The computer program product of claim 9, wherein the one or more permission parameters further comprises a start and end time parameter.

* * * * *